US012662744B2

(12) United States Patent (10) Patent No.: US 12,662,744 B2
Jensen (45) Date of Patent: Jun. 23, 2026

(54) SYSTEMS AND METHODS FOR GENERATING SYNTHESIS GAS FOR AMMONIA PRODUCTION

(71) Applicant: DYNELECTRO APS, Gadstrup (DK)

(72) Inventor: Soren Hojgaard Jensen, Gadstrup (DK)

(73) Assignee: DYNELECTRO APS, Gadstrup (DK)

( * ) Notice: Subject to any disclaimer, the term of this patent is extended or adjusted under 35 U.S.C. 154(b) by 722 days.

(21) Appl. No.: 17/922,673

(22) PCT Filed: Mar. 26, 2021

(86) PCT No.: PCT/EP2021/057911
§ 371 (c)(1),
(2) Date: Nov. 1, 2022

(87) PCT Pub. No.: WO2021/223938
PCT Pub. Date: Nov. 11, 2021

(65) Prior Publication Data
US 2023/0193486 A1     Jun. 22, 2023

(30) Foreign Application Priority Data

May 7, 2020     (EP) ..................................... 20173375

(51) Int. Cl.
C25B 9/00          (2021.01)
B01D 53/32       (2006.01)
(Continued)

(52) U.S. Cl.
CPC .............. C25B 9/67 (2021.01); B01D 53/326 (2013.01); C01C 1/0417 (2013.01); C25B 1/042 (2021.01);
(Continued)

(58) Field of Classification Search
CPC ......... C25B 9/67; C25B 1/042; C25B 15/081; C25B 9/77; C25B 9/65; B01D 53/236; C01C 1/0417
See application file for complete search history.

(56) References Cited

U.S. PATENT DOCUMENTS

2012/0241328 A1*   9/2012   Joshi ....................... C25B 13/04
                                                                              205/552
2022/0081785 A1*   3/2022   Mortensen .............. C25B 1/042

FOREIGN PATENT DOCUMENTS

WO          2019/072608 A1     4/2019

OTHER PUBLICATIONS

G. Cinti et al., "coupling Solid Oxide Electrolyser (SOE) and ammonia production plant", Applied Energy, 192 (C), Sep. 16, 2016, pp. 466-476 See Spc., p. 1 See EESR See International Search.

(Continued)

*Primary Examiner* — Zulmariam Mendez
(74) *Attorney, Agent, or Firm* — Secant IP, P.L.L.C.

(57) ABSTRACT

This invention relates to system for the production of ammonia synthesis gas, comprising: one or more electrically driven air separation unit(s) configured to separate nitrogen from air; and one or more solid oxide electrolysis cell(s) configured to produce hydrogen by solid oxide electrolysis of steam in thermoneutral or endothermal mode. By configuring the electrically driven air separation unit(s) and the solid oxide electrolysis cell(s) so that heat emanating from the one or more electrically driven air separation unit(s) is transferred to the one or more solid oxide electrolysis cell(s), nitrogen production may be integrated while enabling high current density, the use of large SOEC stacks and improved (Continued)

reactant conversion. In addition, ammonia production plants comprising the above system as well as related methods are described.

20 Claims, 3 Drawing Sheets

(51) Int. Cl.

| | |
|---|---|
| *C01C 1/04* | (2006.01) |
| *C25B 1/042* | (2021.01) |
| *C25B 9/65* | (2021.01) |
| *C25B 9/67* | (2021.01) |
| *C25B 9/77* | (2021.01) |
| *C25B 15/08* | (2006.01) |

(52) U.S. Cl.

CPC .................. *C25B 9/65* (2021.01); *C25B 9/77* (2021.01); *C25B 15/081* (2021.01)

(56) References Cited

OTHER PUBLICATIONS

Extended European Search Report Corresponding to 20173375.5 mailed Oct. 15, 2020.
International Search Report Corresponding to PCT/EP2021/057911 mailed Jun. 15, 2021.
Written Opinion Corresponding to PCT/EP2021/057911 mailed Jun. 15, 2021.

* cited by examiner

SYSTEMS AND METHODS FOR GENERATING SYNTHESIS GAS FOR AMMONIA PRODUCTION

FIELD OF INVENTION

This invention relates to a novel system for generating a synthesis gas (syngas) for the production of ammonia using solid oxide electrolysis cells (SOECs), and to ammonia production plants comprising the same. Furthermore, methods for the production of ammonia synthesis gas and the synthesis of ammonia are disclosed.

The invention enables ammonia synthesis gas production at high reactant conversion without the necessity of a separate nitrogen production facility.

BACKGROUND OF THE INVENTION

In the recent years, fuels produced by conversion of renewable electrical energy, such as hydrogen, $CO_2$-neutral carbon-based fuels and ammonia ($NH_3$) have gained increased interest in view of their potential for chemical energy storage and energy transport.

Conventional ammonia-producing plants are based on conversion of a desulfurized hydrocarbon gas, such as natural gas (i.e. methane), LPG (a liquefied petroleum gas) or petroleum naphtha into gaseous hydrogen by steam reforming, and subsequent synthesis of ammonia via the Haber-Bosch process, by conversion of a synthesis gas (syngas) comprising the thus produced hydrogen ($H_2$) and nitrogen ($N_2$) in a molar ratio of about 3:1:

$$3H_2 + N_2 \rightarrow 2NH_3$$

Given that ammonia is one of the most widely produced chemicals (especially for fertilizer applications and other purposes), efforts have been made to provide alternatives to natural gas-based production of ammonia based on green power.

For example, G. Cinti et al., Applied Energy 2017, 192 (C), 466-476 propose a concept, wherein solid oxide electrolysis cells (SOEC) are used for the production of hydrogen and coupled with an improved Haber Bosch Reactor (HBR) for ammonia synthesis. Advantageously, solid oxide electrolysis may be performed with extremely high efficiency, particularly upon recovering the high temperature heat from the Haber-Bosch reactor. The nitrogen gas required for ammonia syngas is produced by separating it from atmospheric air in so-called air separation units (ASUs). Typically, such air separation units use fractional distillation, cryogenic air separation, or pressure swing adsorption to separate nitrogen from air.

From an economical point of view, said air separation devices are disadvantageous, especially when being adapted for small-scale systems. WO 2019/072608 A1 addresses this problem by proposing a method for generating ammonia synthesis gas comprising the steps of: feeding a mixture of steam and compressed air into the electrolysis unit or into the first of a series of electrolysis units and passing the outlet from one electrolysis unit to the inlet of the next electrolysis unit, either together with air added after each electrolysis unit or only adding air after the last electrolysis unit. Herein, the electrolysis units are run in thermoneutral or endothermal mode, and the nitrogen part of the synthesis gas is provided by burning the hydrogen produced by steam electrolysis by air in or between the electrolysis units. Accordingly, the method does not require the use of an air separation unit by taking advantage of the ability of being operated in an endothermal mode.

However, the method disclosed in WO 2019/072608 A1 has some disadvantages. In endothermic operation, heat generated via irreversible losses is lower than the thermal energy consumed by the reaction, which results in a temperature decrease as the reaction proceeds along the stack. Thermoneutral stack operation occurs when the thermal energy consumed by the reaction is precisely matched by the heat generated via irreversible losses. The operating mode depends on the operating conditions (such as stack temperature, average current density, operating voltage, steam utilisation and the inlet gas composition), as well as materials selection and cell and stack geometry. In the method of WO 2019/072608 A1, the exothermal burning of hydrogen generates relatively high reaction heat, and since the electrolysis stacks are operated endothermally, the size of the stack is strictly limited, since excess airflow is required to control the temperature variation from gas inlet to gas outlet, which ultimately reduces reactant conversion. Thus, the average current density, being proportional to the production rate of hydrogen, leaves room for improvement.

Moreover, local temperature variations in the stack may also cause thermomechanical tensile stress at the interconnect/cell interface, which may potentially lead to delamination and loss of contact, increasing the internal resistance in the cells. Decreased uniformity in the current density and conversion of the reactant gas may further accelerate degradation of the cells.

In view of the above, there still exists a need to provide a system for ammonia synthesis gas and a method of its operation which addresses the above-identified problems.

SUMMARY OF THE INVENTION

The present invention solves these objects with the subject matter of the claims as defined herein. Further advantages of the present invention will be further explained in detail in the section below.

In one aspect, the present invention relates to a system for the production of ammonia synthesis gas, comprising: one or more electrically driven air separation unit(s) configured to separate nitrogen from air; and one or more solid oxide electrolysis cell(s) configured to produce hydrogen by solid oxide electrolysis of steam in thermoneutral or endothermal mode; wherein the electrically driven air separation unit(s) and the solid oxide electrolysis cell(s) are configured so that heat emanating from the one or more electrically driven air separation unit(s) is transferred to the one or more solid oxide electrolysis cell(s).

By integrating one or more electrically driven air separation units into the SOEC stack, the heat generated by these cells that produce nitrogen for the downstream $NH_3$ synthesis can be utilized by the endothermic hydrogen-producing cells. In this way, the requirement for a separate nitrogen production facility can be removed. Moreover, since heat generation in the $N_2$-producing cells is lower compared to the heat of exothermal burning of hydrogen, it is possible to increase the current density, and large SOEC stacks may be used since the requirement for air overblow to limit the temperature variation from gas inlet to gas outlet can be removed. Ultimately, the stack can be operated with a higher reactant conversion, which simplifies the BOP (balance of plant). In addition, the system may be manufactured and operated in an inexpensive manner.

In another aspect, the present invention provides an ammonia production plant, comprising the aforementioned system for the production of ammonia synthesis gas and an ammonia synthesis reactor configured to produce ammonia by reacting the hydrogen with the nitrogen.

In a third aspect, the present invention relates to a process for production of ammonia synthesis gas by electrolysis, said process comprising the steps of: (a) producing nitrogen from air in one or more electrically driven air separation unit(s), and (b) producing hydrogen by solid oxide electrolysis of steam in one or more solid oxide electrolysis cell(s) operating in thermoneutral or endothermal mode; wherein the electrically driven air separation unit(s) and the solid oxide electrolysis cell(s) are configured so that heat emanating from the one or more electrically driven air separation unit(s) is transferred to the one or more solid oxide electrolysis cell(s).

A fourth aspect of the present invention relates to a process for synthesizing ammonia, comprising the steps of: producing ammonia synthesis gas according to the third embodiment, (c) directing the gas stream comprising nitrogen produced in step a) and the gas stream comprising hydrogen produced in step b) to an ammonia synthesis reactor; and (d) generating ammonia in said ammonia synthesis reactor by reacting the hydrogen with the nitrogen.

Preferred embodiments of the system, the ammonia production plant and the related methods, as well as other aspects of the present invention are described in the following description and the claims.

DETAILED DESCRIPTION OF THE INVENTION

Figure 1:
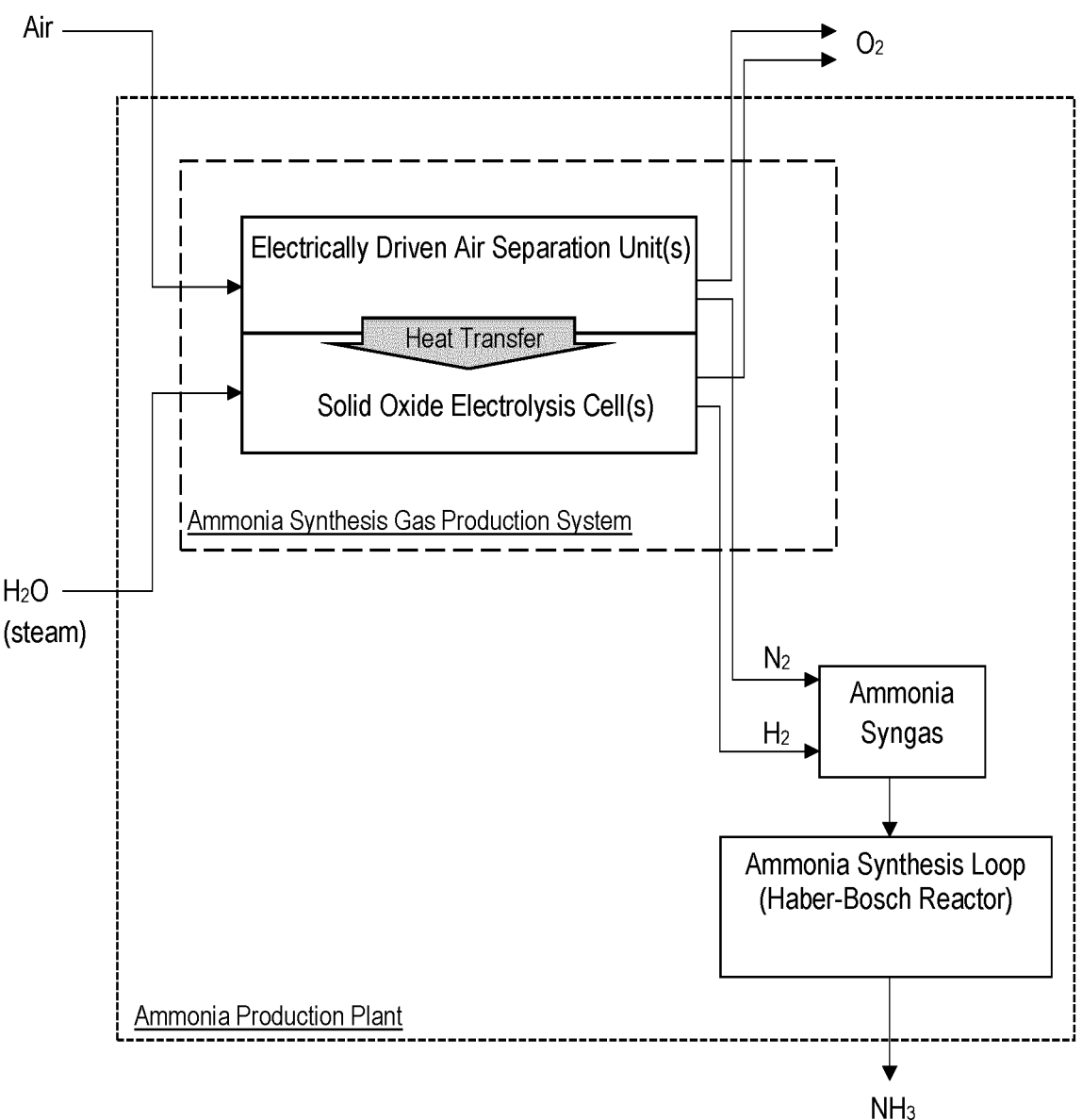
FIG. 1 illustrates the general concept of the method of the present invention.

For a more complete understanding of the present invention, reference is now made to the following description of the illustrative embodiments thereof:
System for the Production of Ammonia Syngas and Ammonia Production Plant In a first embodiment, the present invention relates to a system for the production of ammonia synthesis gas, comprising: one or more electrically driven air separation unit(s) configured to separate nitrogen from air; and one or more solid oxide electrolysis cell(s) configured to produce hydrogen by solid oxide electrolysis of steam in thermoneutral or endothermal mode; wherein the electrically driven air separation unit(s) and the solid oxide electrolysis cell(s) are configured so that heat emanating from the one or more electrically driven air separation unit(s) is transferred to the one or more solid oxide electrolysis cell(s). The basic principle of the system according to the present invention is illustrated in FIG. 1.

The term "electrically driven air separation unit", as used herein, is understood to denote a device configured to produce nitrogen or oxygen-depleted air by application of electric energy, preferably by electrolytic processes. Particularly preferred examples of such separation units include solid oxide electrolysis cells or stacks thereof, as they operate under conditions similar to the hydrogen-producing SOEC(s) any may be thus easier integrated to enable effective heat exchange.

While not being limited thereto, an exemplary embodiment of such a solid oxide electrolysis cell for air separation comprises an oxygen-ion conducting solid state electrolyte sandwiched between anode and cathode sides, which will be further described in the following. The cell is generally provided with an inlet for air, from which oxygen is extracted, and may include an oxygen-ion conducting ceramic membrane located (sandwiched) between two electrode layers (anode and cathode). The membrane electrolyte may be composed of suitable materials known in the art. While not being limited thereto, metal oxide (ceramic) powder, such as yttria stabilized zirconia (YSZ) (e.g., $(ZrO_2)_{0.92}(Y_2O_3)_{0.08}$ (also known as 8YSZ) or $(ZrO_2)_{0.90}(Y_2O_3)_{0.10}$); scandia stabilized zirconia (SSZ) (e.g., $(ZrO_2)_{0.9}(Sc_2O_3)_{0.1}$); gadolinium-doped ceria (CGO) (e.g., $(CeO_2)_{0.8}(Gd_2O_3)_{0.2}$); $La_{0.8}Sr_{0.2}Ga_{0.85}Mg_{0.15}O_{2.825}$ (LSGM20-15); $(Bi_2O_3)_{0.75}(Y_2O_3)_{0.25}$; and mixed ionic electronic conductors (e.g., $SrCo_{1-x}Fe_xO_{3-\delta}$ ($0.30{\geq}X{\geq}0.20$), $La_{0.6}Sr_{0.4}Co_{0.6}Fe_{0.4}O_{3-\delta}$, $La_{0.8}Sr_{0.2}MnO_3$, $La_{0.65}Sr_{0.30}MnO_3$, $La_{0.45}Sr_{0.55}MnO_3$, $Sr_{0.7}Ce_{0.3}MnO_{3-\delta}$, $LaNi_{0.6}Fe_{0.4}O_3$, $Sm_{0.5}Sr_{0.5}CoO_3$ and $La_{1-x}Sr_xCoO_{3-\delta}$) may be mentioned as examples. In preferred embodiments, the oxygen-ion conducting membrane includes YSZ and/or CGO. As anode and cathode material, air electrodes known in the art may be used, including, but not limited to those comprising perovskite-type metal oxides (such as lanthanum strontium cobaltite ferrite (LSCF), lanthanum strontium cobalt oxide (LSC), lanthanum strontium manganese oxide (LSM) or strontium iron molybdenum oxide (SFM) for example) or Ruddlesden-Popper-structured oxides of the type $Ln_2MtO_4$, with Ln being a trivalent lanthanide ion and Mt being a divalent transition metal ion. Suitable air electrodes may also comprise composites comprising porous structures of the aforementioned oxides as electron-conducting phase in combination with electrocatalysts deposited on the microstructure surfaces, such as nanoparticles of gadolinium-doped ceria (CGO) or praseodym-doped ceria (CPO), for example. Upon applying electrical potential across the cell (which may range in some embodiments from 0.1 to 2.2 V, depending on the electrolyte/electrode constitution, conductivity and temperature), oxygen in the air supplied to the cathode side is reduced to oxygen anions ($O^{2-}$), which migrate through the membrane and recombine at the anode side to form oxygen, which may be released through an outlet port. The oxygen-depleted air exiting the cell mainly consists of nitrogen (typically at least 95 vol.-%, such as 96 vol.-% or more, or 98 vol.-% or more) and minor residues of oxygen, argon and carbon dioxide, and may be mixed downstream with hydrogen to produce ammonia syngas.

The system according to the present invention comprises one or more SOEC(s) configured to produce hydrogen by solid oxide electrolysis of steam in thermoneutral or endothermal mode.

The principle of hydrogen production by SOE cells and stacks from water vapor is well known. An SOEC generally comprises a solid-state oxygen-ion conducting electrolyte between a porous oxygen electrode (anode) and a porous fuel electrode (cathode). Suitable materials for the porous oxygen electrode and electrolyte include, but are not limited to the electrode and electrolyte materials disclosed above with respect to the solid oxide electrolysis cell for air separation. While not being limited thereto, nickel-yttria stabilized zirconia (Ni-YSZ cermet) and perovskite-type metal oxides, such as lanthanum strontium manganese (LSM), LSM scandium-doped LSM (LSMS), lanthanum strontium manganese chromate (LSCM), and scandium-doped LCSM (LSCMS), for example) may be mentioned. The general function of the SOEC is to split water in the form of steam into pure $H_2$ and $O_2$. Upon supplying high-temperature steam to the cathode side of the SOEC and applying a suitable cell voltage, the high-temperature steam is decomposed into hydrogen ions and oxygen ions by electrolysis. The generated oxide ions selectively passes through the solid oxide electrolyte membrane and move to the anode side, while hydrogen is obtained at the cathode. The hydrogen-containing gas discharged from the cathode side consists mainly of hydrogen (typically at least 90 vol.-%, such as 91 vol.-% or more, or 92 vol.-% or more) contain residual water vapor, which may be optionally removed with a condenser, an adsorption dryer or the like, to obtain high purity hydrogen gas. Alternatively, the hydro-gen-containing gas may be mixed directly with the nitrogen from the electrically driven ASU to produce the ammonia syngas.

Overall, the electrochemical conversion of $H_2O$ steam to hydrogen gas using a SOEC is an endothermal process. In order to operate at a high electrical-energy efficiency, a heat supply is necessary to compensate for the endothermic heat demand and the heat loss to the surroundings. However, the heat supply must be well-balanced. While, in principle, operation at very high temperatures may be advantageous due to decreased polarization resistance of the cells, the stability of the SOEC stack materials may deteriorate dra-matically, which imposes limitations with respect to the heat supply and the SOEC materials and the geometry or size of the stack (due to an uneven heat distribution throughout the stack, for example). The present invention is based on the finding that electrically driven air separation unit(s), such as solid oxide electrolysis cells for air separation, provide a suitable heat source for the hydrogen-producing SOEC(s).

Accordingly, in the present invention, heat emanating from the one or more electrically driven air separation unit(s) is transferred to the one or more SOEC(s). This may be accomplished by suitably arranging the ASU(s) in prox-imity to the hydrogen-producing SOEC(s).

Figure 2A:
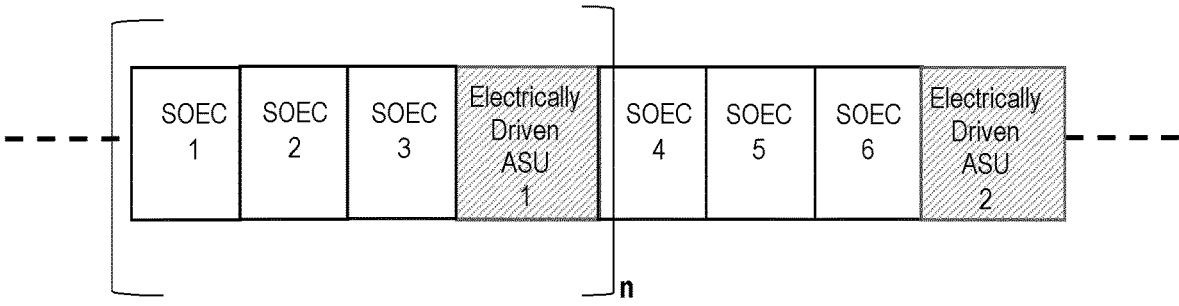
FIGS. 2A to 2C illustrate exemplary stack configurations comprising SOECs and electrically driven air separation units.
Figure 2B:
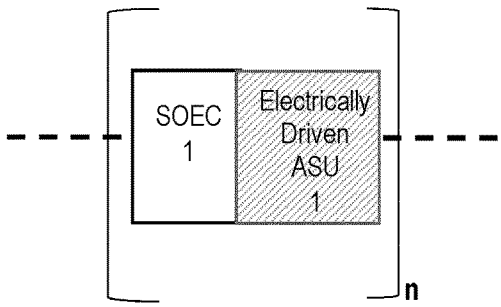

For example, it may be preferred that the one or more nitrogen-producing ASU(s) are directly integrated into a stack of SOECs. Non-limited examples of such arrange-ments are shown in FIGS. 2A to 2C.

In a preferred embodiment, the electrically driven ASU(s) and the SOEC(s) form a stack in which one or two electri-cally driven ASU(s), preferably one ASU, is(are) positioned between two groups of hydrogen-producing SOECs, to enable heat transfer on both sides of the ASU(s). Further preferably, each group of SOECs (i.e. at the left and the right of the one or two ASU(s)) comprises from 1 to 10 solid oxide electrolysis cells operated in series, especially preferably from 1 to 3 solid oxide electrolysis cells, to avoid uneven temperature distribution throughout the cell stack (i.e. from gas inlet to gas outlet). The number of hydrogen-producing SOECs in each group may also be selected in consideration of the molar stochiometry of the nitrogen and hydrogen gases produced by the system. In this respect, a stack arrangement according to FIG. 2A, wherein one nitrogen-producing ASU is positioned between two groups of three hydrogen-producing SOECs may be preferable.

When each group of SOECs (i.e. at the left and the right of the one or two ASU(s)) comprises less than 3 solid oxide electrolysis cells operated in series (such as in FIG. 2B, for example), the system preferably comprise one or more additional hydrogen-producing SOEC(s), to which heat emanating from the one or more electrically driven ASU(s) is not transferred, in order to achieve the desired stochiom-etry for the ammonia syngas. This can be achieved by simply spacing the additional hydrogen producing SOEC cell stack apart from the ASU to avoid heat exchange.

Figure 2C:
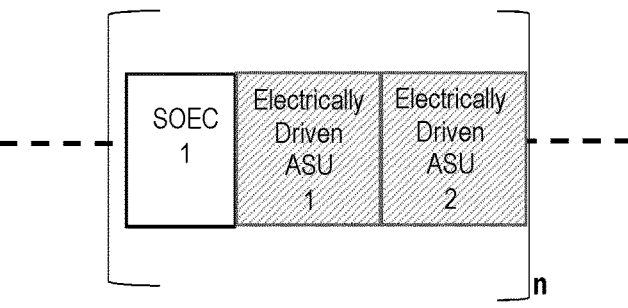

The stack arrangement may further comprise a repeating unit, wherein two ASU(s) are operated adjacently in series (as illustrated in FIG. 2C). More than two ASU(s) in series, are, however, not preferred in view of the reduced heat transfer, the thus resulting uneven temperature distribution throughout the stack and increased polarisation resistance.

Advantageously, the number of individual repeating units (n) in the aforementioned stacks is not substantially limited, and typically range from 1 to 200, such as from 1 to 100, for example.

In a preferred embodiment, the electrically driven air separation unit(s) and solid oxide electrolysis cell(s) are provided in a single pressurized vessel configured to being operated at temperature of between 350° C. to 1000° C., further preferably from 400° C. to 900° C. The term "pres-surized", as used herein, is understood to define a pressure above ambient pressure (1 atm). In preferred embodiments with respect to facilitated control of compression of inlet and outlet gas, the pressurized vessel is configured to operate at a pressure of between 2 to 40 bars. The operational tem-perature may be appropriately selected by the skilled artisan depending on the constitution of the hydrogen-producing SOEC(s) and the ASU(s). For example, the operational temperature in embodiments using YSZ membrane electro-lyte is preferably greater than 450° C., further preferably 600 to 1000° C., to ensure adequate oxygen-ion conductivity in the ceramic membrane. On the other hand, arrangements using doped ceria electrolyte, tend to have optimum perfor-mance in the range of approximately 450 to 600° C.

In view of the above, it is preferred that the electrically driven ASU(s) are selected to operate at a temperature of between 350° C. to 1000° C. More preferably, both the electrically driven ASU(s) and hydrogen-producing SOEC(s) are operated at a temperature of between 350° C. to 1000° C. For this purpose, it is preferred that the ASU(s) consist of solid oxide electrolysis cells or stacks. It may be further preferred that the same solid oxide electrolyte mem-brane, and especially preferably also the same air electrodes are used for both the ASU(s) and the hydrogen-producing SOEC(s) to facilitate the production and simplify stack design.

For $H_2O$ steam electrolysis in the SOEC(s), the thermo-neutral potential ($E_{tn}$) is approximately 1.3 V. In high temperature electrolysis cells, $E_{tn}$ is substantially higher than the open circuit voltage (OCV), i.e. the voltage across the terminals of an electrolysis cell and in the absence of external current flow. For typical SOEC operating tempera-tures and gas compositions at ambient pressure, the OCV is slightly below 1 V. In such electrolysis systems, operation of an SRU at $E_{tn}$ typically causes excessive degradation due to the high electrode overvoltage(s) in the SRU and/or adsorp-tion of impurities at the electrochemically active sites in the electrodes. Increasing the SRU voltage above $E_{tn}$ (and thus further increasing the electrolysis current density) will accel-erate the degradation, lower the conversion efficiency and increase the need for thermal control to dissipate the exces-sive Joule heat. Also, when the SRU voltage and current is changed, the temperature distribution in the stack gradually change due to variation of reaction and Joule heat produc-tion. This introduces thermo-mechanical stress, which may lead to loss of contact at the interfaces between the various layers in the stack (typically between stack and bipolar interconnect plates). To alleviate this problem, it is preferred that the system according to the present invention further comprises at least one power electronic unit, wherein the power electronic unit(s) is(are) configured to provide(s) periodical cell voltage variations to the electrically driven air separation unit(s) and/or the solid oxide electrolysis cell(s) with a frequency in the range of from 10 mHz to 100 kHz. Advantageously, by applying such periodical cell voltage variations, an air-overblow for minimizing the temperature variation from gas inlet to gas outlet is not required. Thus, the system may be simplified and the size of the SOEC stacks may be increased. In a further preferred embodiment of the present invention, the power electronic unit may comprise a DC power supply with a pulse width modulation (PWM) motor controller, a bi-directional power supply, or a power supply combined with an electronic load (e-load).

Usually, sufficient heat distribution throughout the stack may be achieved passively, by the above-described arrangements and/or by applying the voltage variation (as will be further described below in conjunction with the third embodiment. However, the system according to the present invention may, alternatively or in combination, comprise a heat distribution device configured to distribute the heat emanating from the one or more electrically driven air separation unit(s) among the one or more solid oxide electrolysis cell(s). As an example of such a heat distribution device, a high temperature blower or a similar device may be mentioned.

The system according to the present invention may further encompass one or more heating devices or compressors at the upstream and/or downstream sides of the ASU/SOEC devices, for the purpose of suitably adjusting the temperature and pressure of the inlet and/or outlet gases.

In a second embodiment, the present invention provides an ammonia production plant, comprising the system for the production of ammonia synthesis gas according to the first embodiment described above and an ammonia synthesis reactor configured to produce ammonia by reacting the hydrogen with the nitrogen.

The ammonia synthesis reactor may be integrated into an ammonia synthesis loop, wherein a condenser is employed to effect separation of ammonia product and non-converted steam, which is then sent to the inlet of the ammonia synthesis loop.

To avoid catalyst poisoning in the ammonia synthesis loop, the plant may further comprise a methanation reactor upstream of the ammonia synthesis loop configured to remove residual carbon dioxide, for example.

Processes for the Production of Ammonia Synthesis Gas and Ammonia

In a third embodiment, the present invention relates to a process for production of ammonia synthesis gas by electrolysis, said process comprising the steps of: (a) producing nitrogen from air in one or more electrically driven air separation unit(s), and (b) producing hydrogen by solid oxide electrolysis of steam in one or more solid oxide electrolysis cell(s) operating in thermoneutral or endothermal mode; wherein the electrically driven air separation unit(s) and the solid oxide electrolysis cell(s) are configured so that heat emanating from the one or more electrically driven air separation unit(s) is transferred to the one or more solid oxide electrolysis cell(s).

In the electrically driven air separation unit(s), nitrogen is preferably produced by separating oxygen from air using an oxygen ion-conductive solid electrolyte ceramic membrane, further preferably by using a solid oxide electrolyte cell for oxygen separation, as is described in detail above in conjunction with the first embodiment.

In preferred embodiments, the electrically driven air separation unit(s) are operated at a temperature of between 350° C. to 1000° C., such as from 400 to 900° C. More preferably, both the electrically driven air separation unit(s) and solid oxide electrolysis cell(s) are operated at a temperature of between 350° C. to 1000° C., such as from 400 to 900° C.

In another preferred embodiment, a cell voltage applied to the electrically driven air separation unit(s) and/or the solid oxide electrolysis cell(s) is periodically varied with a frequency in the range of from 10 mHz to 100 kHz.

The voltage variations are ideally configured such that near-thermoneutral operation at part load is enabled by matching the integral Joule heat production with the integral reaction heat consumption inside said cell(s). In practice, actual electrolysis systems typically operate at conditions that are neither fully isothermal nor fully adiabatic. The term "near-thermoneutral operation", as used herein, denotes electrolysis operation where the absolute value of the difference between the integrated Joule heat production and the integrated reaction heat consumption (both integrated over a period of more than 3600 seconds) is less than the absolute value of the integrated heat consumption or the absolute value of the integrated heat production, or both. In preferred embodiments, "near-thermoneutral operation" may also be understood as electrothermal balanced operation, which uses electric (Joule) heat to balance the required reaction heat and can be distinguished from conventional thermal balanced operation where the thermal capacity of excess air flow is used limit temperature variations in electrolysis cells and stacks.

In preferred embodiments, the periodical cell voltage variation applied to the solid oxide electrolysis cell(s) has an amplitude of from between 0.2 V and 2.0 V, preferably between 0.5 V and 1.9 V, which enables improved control of the temperature distribution in electrolysis cells and stacks. When applied to the electrically driven ASU(s), the periodical cell voltage variation preferably has an amplitude of from between 0.05 V and 0.6 V, preferably between 0.1 V and 0.5 V The shape of the periodical cell voltage variation can be in principle of any type. However, voltage variations comprising sine-wave shaped and/or square-wave shaped voltage variation profiles are preferable. Especially preferred is a mix between sine-shaped and the square-shaped voltage variations to minimize the peak voltage and to minimize erroneous operation conditions related to induction phenomena.

In embodiments, the voltage variation(s) may also be configured to effect volatilization, desorption or dissolution of side reaction compounds adsorbed, precipitated or otherwise formed in the electrodes of the cell(s), e.g. by increasing the oxidation state (oxidation) or decreasing the oxidation state (reduction) of said side reaction compounds, which leads to degradation decrease, more stable cell voltage and extended lifetime of the cells. While not being limited thereto as long as their formation is reversible, such side reaction compounds may be undesired intermediates or originate from impurities in the reactant (e.g., sulphur-based compounds) or from electrolysis cell materials (e.g., Si-based impurities from glass components). Desorption or dissolution of side reaction compounds may be achieved by periodical changes to the cell voltage so that the electrochemical cells switch between electrolysis and fuel cell mode operation, for example.

In a fourth embodiment, the present invention relates to a process for synthesizing ammonia, comprising the steps of: producing ammonia synthesis gas according to the third embodiment described above, (c) directing the gas stream comprising nitrogen produced in step (a) and the gas stream comprising hydrogen produced in step (b) to an ammonia synthesis reactor; and (d) generating ammonia in said ammonia synthesis reactor by reacting the hydrogen with the nitrogen.

In order to improve yield and purity of the final product, the method may further comprise steps of: e) separating non-converted syngas from the generated ammonia, e.g. by a condenser, and f) adding the non-converted syngas to the gas streams directed to the ammonia synthesis reactor in step (c).

To avoid catalyst poisoning in the ammonia synthesis loop, the plant may further comprise a methanation reactor upstream of the ammonia synthesis loop configured to remove residual carbon dioxide, for example.

It will be understood that the preferred features of the first to fourth embodiments may be freely combined in any combination, except for combinations where at least some of the features are mutually exclusive.

EXAMPLE

Figure 3:
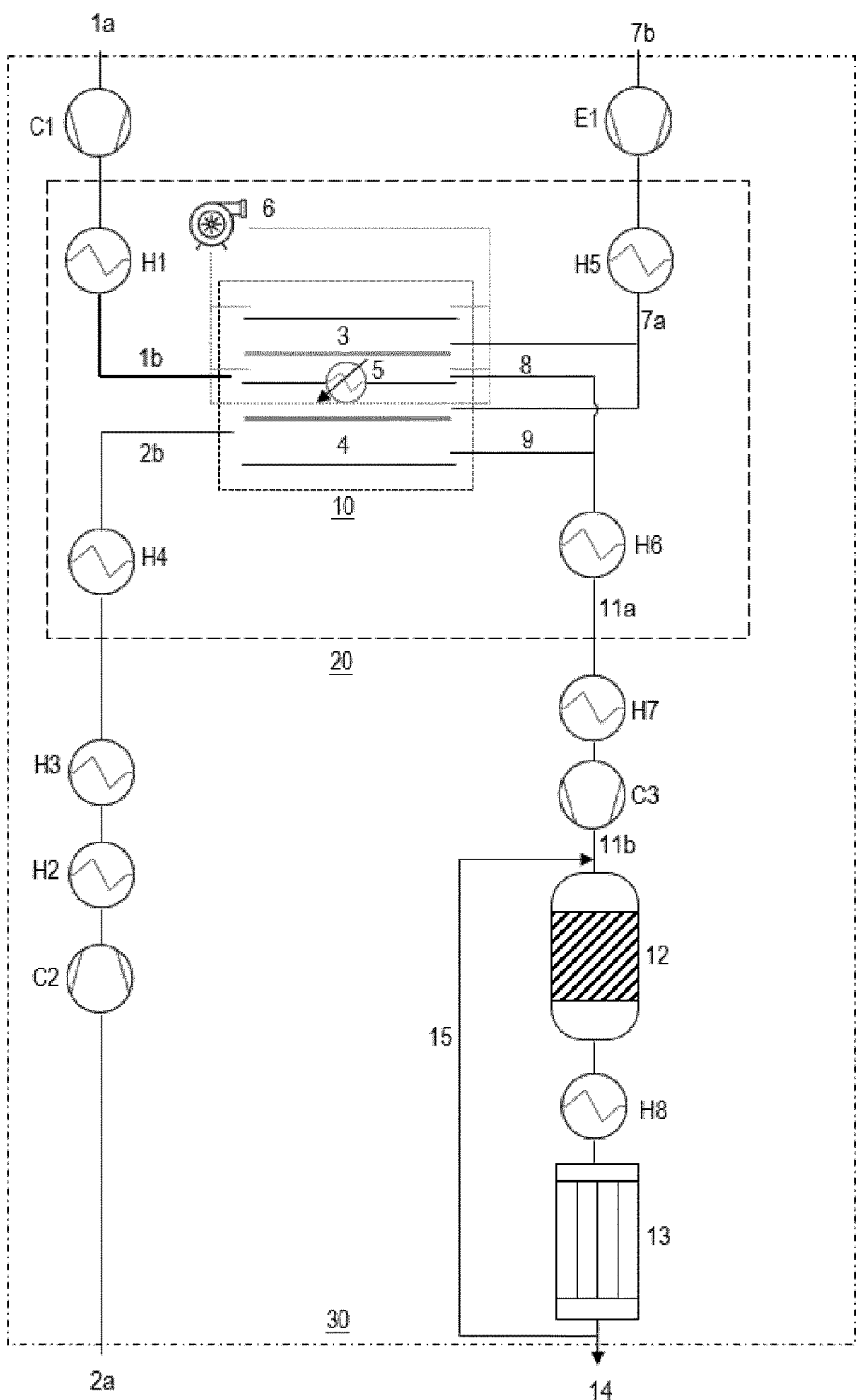
FIG. 3 illustrates a system for ammonia synthesis and an ammonia production plant according to an example of the present invention.

The layout of a particular example of the present invention is described in the following, with reference to FIG. 3.

With a flow rate of 121 Nm³/h, ambient air (1a) was compressed and conveyed to a pressurized vessel (10) (10 bar), wherein it was heated to a temperature of 690° C. before being fed into an electrically driven ASU (3), in this case a solid oxide electrolytic cell comprising two air electrodes, operated with a cell voltage of 0.252 V, to effect separation of oxygen from air. The resulting nitrogen-containing stream (8) had a temperature of 715° C., a nitrogen content of 99 mol.-% and a residual oxygen content of about 1 mol.-%.

At a flow rate of 254 kg/h, liquid water (2a) was conveyed through a series of heaters and a compressor to provide superheated steam (2b) having a temperature of 700° C. The steam was fed into an SOEC stack (4) operated with a cell voltage of 1.248 V. The ASU/SOEC combination was arranged so that two groups consisting of three SOECs were provided on each side of a single ASU (adjacent in series) to ensure efficient heat transfer (5) from the electrically driven ASU to each of the SOEC cells without the use of an optional heat distribution device (6). The ASU/SOEC stack was operated at a power density of 0.51 Ω/cm² and a current density of 0.39 A/cm². The hydrogen-containing stream (9) exiting the SOEC stack at a temperature of 700° C. had a hydrogen content of 93 mol.-% and a residual water content of about 7 mol.-%.

The streams of nitrogen-containing gas (8) and hydrogen-containing gas (8) were mixed and heated to 730° C., resulting in a stoichiometric 3:1 mixture of hydrogen and nitrogen (i.e. 23.6 mol.-% $N_2$, 70.7 mol.-% $H_2$ and 5.7 mol.-% of residual $H_2O$). Upon exiting the pressurized vessel, the thus produced syngas (11a) was heated and compressed to about 300 bar, before being fed to an ammonia synthesis reactor (12). Non-converted syngas was separated from ammonia (14) by means of a condenser (13), and re-fed to the synthesis reactor (12) via recycle loop (15). Accordingly, 130 kg/h of liquid ammonia were produced at a conversion efficiency of 98%.

In comparison to a system, wherein the nitrogen part of the synthesis gas is provided by burning the hydrogen produced by steam electrolysis by air in or between the SOECs, it was possible to increase the current density by approximately 30%, and a higher reactant conversion was observed.

Thus, it has been shown that the present invention removes the requirement for a separate nitrogen production facility, while simultaneously enabling an increase in current density, the use of large SOEC stacks and an improve conversion of hydrogen and nitrogen.

Once given the above disclosure, many other features, modifications, and improvements will become apparent to the skilled artisan.

REFERENCE NUMERALS

H1-H8: heaters
C1-C3: compressors
E1: expander
1a/1b: air/compressed heated air
2a/2b: water/steam
3: electrically driven air separation unit (ASU)
4: solid oxide electrolysis cell (SOEC) stack
5: heat exchange
6: heat distribution device
7a/7b: oxygen-containing gas
8: nitrogen-containing gas
9: hydrogen-containing gas
10: pressurized vessel
11a/11b: ammonia synthesis gas
12: ammonia synthesis reactor
13: condenser
14: ammonia-containing product
15: recycle loop
20: ammonia synthesis gas production system
30: ammonia production plant

The invention claimed is:

1. A system for the production of ammonia synthesis gas, comprising:

one or more electrically driven air separation unit(s) configured to electrolytically separate nitrogen from air; and one or more solid oxide electrolysis cell(s) configured to produce hydrogen by solid oxide electrolysis of steam in thermoneutral or endothermal mode;

wherein the electrically driven air separation unit(s) and the solid oxide electrolysis cell(s) are provided separately and configured so that heat emanating from the one or more electrically driven air separation unit(s) is transferred to the one or more solid oxide electrolysis cell(s).

2. The system for the production of ammonia synthesis gas according to claim 1, wherein the electrically driven air separation unit(s) and the solid oxide electrolysis cell(s) form a stack in which one or two electrically driven air separation unit(s), are positioned between two groups of solid oxide electrolysis cells.

3. The system for the production of ammonia synthesis gas according to claim 2, wherein each group of solid oxide electrolysis cells comprises from 1 to 10 solid oxide electrolysis cells operated in series.

4. The system for the production of ammonia synthesis gas according to claim 3, wherein each group of solid oxide electrolysis cells comprises fewer than 3 solid oxide electrolysis cells operated in series.

5. The system for the production of ammonia synthesis gas according to claim 1, wherein the electrically driven air separation unit(s) and solid oxide electrolysis cell(s) are provided in a single pressurized vessel configured to being operated at temperature of between 350° C. to 1000° C.

6. The system for the production of ammonia synthesis gas according to claim 1, further comprising at least one power electronic unit, wherein the power electronic unit(s) is (are) configured to provide(s) periodical cell voltage variations to the electrically driven air separation unit(s) and/or the solid oxide electrolysis cell(s) with a frequency in the range of from 10 mHz to 100 KHz.

7. The system for the production of ammonia synthesis gas according to claim 1, further comprising a heat distribution device configured to distribute the heat emanating from the one or more electrically driven air separation unit(s) among the one or more solid oxide electrolysis cell(s).

8. An ammonia production plant, comprising the system for the production of ammonia synthesis gas according to claim 1, and an ammonia synthesis reactor configured to produce ammonia by reacting the hydrogen with the nitrogen.

9. A process for production of ammonia synthesis gas by electrolysis, said process comprising the steps of:
   (a) producing nitrogen electrolytically from air in one or more electrically driven air separation unit(s), and
   (b) producing hydrogen by solid oxide electrolysis of steam in one or more solid oxide electrolysis cell(s) operating in thermoneutral or endothermal mode;
   wherein the electrically driven air separation unit(s) and the solid oxide electrolysis cell(s) are provided separately and configured so that heat emanating from the one or more electrically driven air separation unit(s) is transferred to the one or more solid oxide electrolysis cell(s).

10. The process for production of ammonia synthesis gas according to claim 9, wherein in the electrically driven air separation unit(s), nitrogen is produced by separating oxygen from air using an oxygen ion-conductive solid electrolyte ceramic membrane.

11. The process for production of ammonia synthesis gas according to claim 9, wherein the electrically driven air separation unit(s) is operated at a temperature of between 350° C. to 1000° C.

12. The process for production of ammonia synthesis gas according to claim 11, wherein the electrically driven air separation unit(s) and solid oxide electrolysis cell(s) are operated at a temperature of between 350° C. to 1000° C.

13. The process for production of ammonia synthesis gas according to claim 9, wherein the cell voltage applied to the electrically driven air separation unit(s) and/or the solid oxide electrolysis cell(s) is periodically varied with a frequency in the range of from 10 mHz to 100 KHz such that near-thermoneutral operation at part load is enabled by matching
   the integral Joule heat production with the integral reaction heat consumption inside said unit(s) and/or cell(s).

14. The process for production of ammonia synthesis gas according to claim 13, wherein the periodical cell voltage variation applied to the solid oxide electrolysis cell(s) has an amplitude of from between 0.2 V and 2.0 V.

15. The process for synthesizing ammonia according to claim 9, the process further comprising:
   (c) directing the gas stream comprising nitrogen produced in step a) and the gas stream comprising hydrogen produced in step b) to an ammonia synthesis reactor; and
   (d) generating ammonia in said ammonia synthesis reactor by reacting the hydrogen with the nitrogen.

16. The system of claim 2 wherein the stack comprises one electrically driven air separation unit positioned between two groups of solid oxide electrolysis cells.

17. The system of claim 3 wherein each group of solid oxide electrolysis cells comprises from 1 to 3 solid oxide electrolysis cells.

18. The system of claim 4 wherein each group of solid oxide electrolysis cells are in combination with one or more additional solid oxide electrolysis cell(s) configured to produce hydrogen, to which heat emanating from the one or more electrically driven air separation unit(s) is not transferred.

19. The system of claim 7 wherein the heat distribution device is a high temperature blower.

20. The process of claim 14 wherein the periodical cell voltage variation applied to the solid oxide electrolysis cell(s) has an amplitude of from between 0.5 V and 1.9 V.

* * * * *